United States Patent Office 2,893,870
Patented July 7, 1959

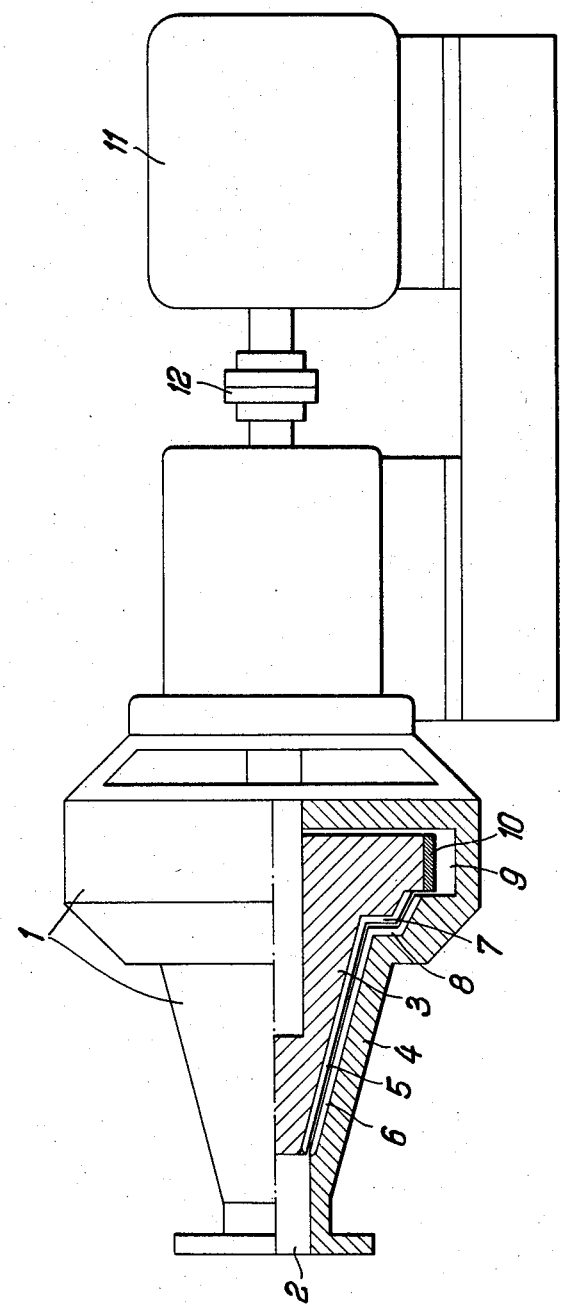

2,893,870

HOPPING OF BEER

Kurt Ritter, Koln-Deutz, Germany, assignor to Heinr. Auer Muhlenwerke Kommanditgesellschaft, auf Aktien, Koln-Deutz, Germany Application April 3, 1957, Serial No. 650,474

Claims priority, application West German Republic April 7, 1956

7 Claims. (Cl. 99—50.5)

The invention relates to improvements in beer brewing and more particularly to an improved method of hopping beer.

The brewing of beer comprises generally the following steps: Ground malt is mashed with water, and the obtained malt solution (first wort) is freed from the malt residues (spent grains). Subsequently, the wort is boiled with addition of the required amount of hops and then separated from the spent hops and fermented with yeast. The hops are generally added as such or in coarsely disintegrated state to the wort.

Said procedure has the drawback that, on boiling, only about one-third to one-fourth of the bitter principle (resins), contained in the hops, passes into the wort; in addition, a certain amount of the resins, e.g. about 3 to 7 percent, is lost in further processing (fermentation and storage) by precipitation.

So far, attempts to eliminate said drawbacks have not met with satisfactory results. Recently, it has been proposed to extract the resins by subjecting the hops in water or aqueous solutions to ultrasonic irradiation and to introduce the thus obtained resin extract into the boiling wort instead of hopping with natural hops. Said method, however, must be carried out with expensive and delicate devices, the operation of which requires high energy cost, and which are therefore uneconomical for commercial purposes. The preparation of such resin extracts by means of ultrasonic irradiation takes considerable time, for instance 1 to 2 hours and more. During this prolonged treatment, undesired side reactions may take place which may affect the brewing process, for instance with respect to the uniformly fine and pleasant taste of the produced beer.

It is a principal object of the invention to provide a simple, reliable, and economic hopping procedure.

It is another object of the invention to provide a method by which the required amount of hops is considerably reduced and nonetheless a beer of uniform excellent quality and taste is produced.

Other objects and advantages will be apparent from a consideration of the specification and claims.

According to the invention, the hops, in divided, preferably in coarsely disintegrated form, are mixed with wort, and the mixture is subjected by mechanically produced vibrations to the impact of pressure and shock impulses and to stresses and sudden releases thereof. In this way, the hops are subtantially completely disintegrated and reduced to a fine dispersion, which is used for the hopping of the beer.

Said dispersion is prepared by mixing the hops, preferably in the coarsely disintegrated state, with a suitable amount of wort and by passing the mixture through a gyrating device in which it is reduced to a dispersion containing the useful components for the beer preparation, particularly the bitter principles, partly in true and partly in colloidal solution, while the insoluble components of the hops are dispersed in the liquid in finest distribution with substantial destruction of the cells.

According to the invention, the thus obtained dispersion is used for hopping in its entirety without previous separation of the solid components from the liquid extract, and the solid components are removed only from the hopped wort by filtration.

The hops dispersion is prepared by means of gyratory devices which contain as principal parts a rotor and a stator, the surfaces of which are provided with dispersing members and which are given a relative motion with respect to each other.

A suitable device is shown, by way of example, in the accompanying drawing.

In the drawing, the gyratory device is represented by the reference numeral 1, into which a suspension prepared from hops and wort is continuously introduced through inlet 2. The device comprises a rotor 3 and a stator 4; dispersing elements 5 and 6 are represented by grooves between which ribs are provided. The part of the device which is most important for the dispersing effect, is constituted by the throttling zone comprising chambers 7 and 8. Any number of said chambers may be provided. For instance, 200 chambers may be arranged on the rotor, and the same number on the stator. The number of the grooves 5 and 6 may be smaller than the number of the chambers. For instance, 40 grooves may be provided each on the rotor and stator. The dispersion leaving the throttling zone is collected in the chamber 9 from which it is removed by means of blades 10 through an outlet (not shown).

The device 1 is connected, by means of a coupling 12, with an electromotor 11.

In carrying out the invention, the hops are ground, which should be done fast, to exclude harmful oxidizing effects. Preferably immediately following the grinding operation, the ground hops are introduced into a mixing vessel, which receives at the same time a suitable amount of wort. Hops and wort are thoroughly and evenly wetted, which generally requires only a few minutes, and the suspension is continuously fed in the inlet 2 of the gyratory device 1.

In the commercial operation of the process, it has been found that it is not necessary to grind the hops; the hops may be passed into the gyratory device directly in the form as they are marketed. This applies particularly to large and powerful gyratory devices. As hereby the disintegration of the hops takes place after introduction into the gyratory device, in the first part thereof, the risk of harmful oxidation effects, which may occur in the conventional first disintegration step, is avoided. In addition, the whole first disintegration step is eliminated. Due to the driving force, increased by the centrifugal force, the hops suspension flows substantially in radial direction through the device. The suspension passes through the throttling zone, which in the illustrated example 5 consists of a great number of recesses in the stator as well as in the rotor. In said zone, the following action takes place.

The chambers arranged in the rotor pass by the stationary chambers of the stator in the rhythm of the number of the chambers and the speed of rotation. As soon as rotor chambers and stator chambers are in opposition, the treated material passes from the rotor chambers into the adjacent stator chambers. When, on further rotation, a rotor chamber is no longer opposite a stator chamber but opposite a partition between two stator chambers, the flow of the material is stopped. Therefore, the material is dammed up. This sequence is repeated at every phase of the rotary movement, whereby first chambers of the rotor and stator are in opposition and then the rotor chambers are opposite the partitions between pairs of stator chambers. As a result, there is a continual change of stresses and stress releases in the charge.

Hereby, also the cells of the hops are subjected to alternating stresses and stress releases, by which their contents are laid open; they are either dissolved in the liquid medium or form therein a colloidal solution. The undissolved solid particles, the cells of which are substantially broken up, are dispersed in finest distribution in the liquid.

As the passage of the hops-wort mixture through the gyratory device takes only fractions of a second, there are no harmful side reactions, particularly no oxidations, and no harmful heating of the rotor.

The operation of the gyratory device and the reactions taking place therein can be controlled in such a way that the decomposition of the hops, the solution of the soluble active components contained therein, and the fine distribution take place with formation of dispersions which are particularly suitable for the hopping of the beer.

If, for instance, the motor is driven with 3,000 r.p.m., the frequency of the alternating stresses within the charge is $$\frac{200 \cdot 3000}{60} = 10,000 \text{ per second}$$

Although the hops-wort suspension remains for a very short time in the device, it was found that the same is converted, particularly in the throttling zone, to a fine dispersion which contains the soluble components of the hops, including the colloids contained in the hops, in dissolved or colloidally dissolved form, respectively, and the undissolved solid materials in substantially decomposed form in very fine dispersion.

The best suitable proportions of hops and wort may be determined by a preliminary test. Generally about 100 liter of wort are employed for the dispersion of .5 to 1.0 kg. of hops. The disintegrating treatment may be carried out with advantage at moderately elevated temperatures, for instance at temperatures of about 50–100° C.

The entire obtained dispersion is added to the wort to be hopped in the manner conventionally employed for the direct addition of natural untreated hops. With respect to said conventional procedure, the novel process has the great advantage that considerable savings of hops are accomplished. Tests on a commercial scale have shown that the normally required amount of hops may be reduced by more than 30 percent—generally up to 50 percent by using hops dispersions prepared according to the invention. Beer obtained with such reduced hops addition is of perfect quality and has a particularly fine taste; in addition, it shows excellent foam formation and stability.

The surprisingly high efficiency of the dispersion and the savings in hops obtained in this way may be perhaps explained by the assumption that the hopping is not effected solely by the resins dissolved in the dispersion and that in the boiling process additional active substances are dissolved out from the finely comminuted solid particles of the dispersion and contribute to the hopping.

Said solid particles are removed only in the filtration of the hopped beer, whereby the presence of said particles has a favorable effect on the filtrating procedure.

I claim:
1. In the brewing of beer, the steps comprising suspending the hops in an aqueous medium, subjecting said hops suspension to a gyratory disintegration to dissolve the hops resins and to disperse the insoluble components into a very fine dispersion, adding said dispersion containing the dissolved hops resins to the wort, subjecting the hopped wort to fermentation and removing said insoluble components only after fermentation.

2. The method as defined in claim 1, wherein wort is used as said aqueous medium.

3. The method as defined in claim 1, wherein whole hops are used in the natural state.

4. The method as defined in claim 1, wherein ground hops are used.

5. The method as defined in claim 1, wherein said gyratory disintegration is carried out at temperatures of 50 to 100° C.

6. The method as defined in claim 1, wherein said gyratory disintegration is carried out to such an extent that substantially the same hopping of the wort is obtained with about 50 to 70 percent less hops than required with normally ground hops.

7. In the brewing of beer, the steps comprising subjecting a suspension of about 0.5 to 1 parts by weight of hops in 100 parts of wort for a period of time which is less than one second, in a gyratory device at a temperature of about 50 to 100° C. to rapidly alternating mechanical pressure and shock impulses and releases of said impulses, thereby obtaining substantially immediate extraction of the bitter principles and fine dispersion of the insoluble components of the destroyed hop cells, adding the thus obtained wort-hops dispersion to wort to be hopped, hopping, and removing the solid hops particles introduced with said dispersion from the hopped wort after hopping.

References Cited in the file of this patent
UNITED STATES PATENTS

| | | |
|---|---|---|
| 121,902 | Seeger et al. | Dec. 12, 1871 |
| 995,822 | Wallerstein | June 20, 1911 |
| 1,232,098 | Schneider | July 3, 1917 |
| 2,243,143 | Wood | May 27, 1941 |